United States Patent
Hallik

(10) Patent No.: US 7,775,586 B2
(45) Date of Patent: Aug. 17, 2010

(54) ROOF STRUCTURE FOR A MOTOR VEHICLE WITH A FLANGE HAVING A LONGITUDINAL SUPPORTING SECTION

(75) Inventor: Matthias Hallik, Wiesbaden (DE)

(73) Assignee: GM Global Technology Operations, Inc., Detroit, MI (US)

( * ) Notice: Subject to any disclaimer, the term of this patent is extended or adjusted under 35 U.S.C. 154(b) by 112 days.

(21) Appl. No.: 11/813,795

(22) PCT Filed: Apr. 7, 2006

(86) PCT No.: PCT/EP2006/003182

§ 371 (c)(1),
(2), (4) Date: Jul. 12, 2007

(87) PCT Pub. No.: WO2006/108569

PCT Pub. Date: Oct. 19, 2006

(65) Prior Publication Data

US 2008/0129087 A1    Jun. 5, 2008

(30) Foreign Application Priority Data

Apr. 11, 2005    (DE) .................. 10 2005 016 458

(51) Int. Cl.
*B62D 25/06*    (2006.01)
(52) U.S. Cl. .................. 296/210; 296/193.04; 296/29
(58) Field of Classification Search .............. 296/210, 296/216.07, 193.04, 29
See application file for complete search history.

(56) References Cited

U.S. PATENT DOCUMENTS

| | | | | |
|---|---|---|---|---|
| 4,874,200 A | * | 10/1989 | Nasu et al. | 296/193.04 |
| 6,869,137 B2 | * | 3/2005 | Schonebeck | 296/210 |
| 7,144,076 B2 | * | 12/2006 | Wendler et al. | 296/210 |
| 7,234,766 B2 | * | 6/2007 | Uchida et al. | 296/210 |
| 2003/0011213 A1 | * | 1/2003 | Zinsmeister et al. | 296/210 |
| 2007/0228777 A1 | * | 10/2007 | Mollick et al. | 296/210 |

(Continued)

FOREIGN PATENT DOCUMENTS

DE    19709016 A1    9/1998

(Continued)

OTHER PUBLICATIONS

International Search Report for PCT/EP2006/003182, mailed Jun. 23, 2006.

(Continued)

*Primary Examiner*—Jason S Morrow
(74) *Attorney, Agent, or Firm*—Ingrassia Fisher & Lorenz, P.C.

(57) ABSTRACT

A roof structure for a motor vehicle, which has a roof-supporting roof frame, which is suitable to receive different roof modules, such as panoramic roofs, sliding roofs etc. The roof frame of the roof structure according to the invention has a surrounding flange directed towards the roof centre. The flange is additionally formed on the side of the vehicle such that it has a longitudinal supporting section, which extends parallel to the roof frame over the length of the roof frame from the free end of the flange in the direction of the center of the vehicle roof. The flange and the supporting section are formed in one piece according to the invention.

3 Claims, 4 Drawing Sheets

U.S. PATENT DOCUMENTS

2008/0231086 A1 * 9/2008 Mathes et al. ............... 296/210

FOREIGN PATENT DOCUMENTS

| DE | 19946008 A1 | 4/2001 |
| DE | 10233280 A1 | 2/2004 |
| EP | 1232936 | 8/2002 |
| EP | 1375306 | 1/2004 |
| FR | 2632923 | 12/1989 |
| WO | 0194141 A1 | 12/2001 |

OTHER PUBLICATIONS

German Patent Office, German Search Report for German Application No. DE102005016 4583.7, Dec. 8, 2005.

* cited by examiner

ROOF STRUCTURE FOR A MOTOR VEHICLE WITH A FLANGE HAVING A LONGITUDINAL SUPPORTING SECTION

CROSS-REFERENCE TO RELATED APPLICATIONS

This Application is a U.S. National-Stage entry under 35 U.S.C. §371 based on International Application No. PCT/EP2006/003182, filed Apr. 7, 2006, which was published under PCT Article 21(2) and which claims priority to German Application No. DE 10 2005 016 458.7, filed Apr. 11, 2005, which is hereby incorporated by reference.

TECHNICAL FIELD

The following relates to motor vehicles, and more particularly to a roof structure for a motor vehicle.

Vehicles that have a plurality of different roof structures are known from practical application. Thus, besides vehicles with a classic closed sheet metal roof, for example, there also exist vehicles with sliding roofs or with so-called panoramic roofs, in which a large-surface glass sheet is used as vehicle roof.

In this case, the different roof structures that are applied are based on a uniform roof frame structure for the respective vehicle type. Here, classically, the vehicle bodies known from practical application have at least two A-, B- and C-columns, which are connected by means of two structural elements extending in the longitudinal direction of the vehicle and a roof-supporting frame, the different roof modules being inserted in this roof-supporting frame. This structure provides the possibility of converting the optional roof structure selected by the respective buyer or customer in a relatively simple manner.

Recently, because of a greater awareness of increased convenience, buyers of estate vehicles or vans in particular have been choosing an estate vehicle or a van with a panoramic roof instead of a standard sheet metal roof or a sheet metal roof with integrated sliding roof.

In the case of the roof structures of interest within the applicant's company, wherein a "sheet metal roof module" is replaced by a "panoramic roof module", the panoramic glass sheet lies on a continuous surrounding supplementary frame or adapter support. A possible construction of such a roof module of the applicant is described in the earlier patent application DE 103 55 656.7 that has not yet been laid open to public inspection.

In addition, in a conventional roof structure the roof region of the vehicle has a roof channel. In the front roof region, this roof channel itself has a hump or a slight ridge in the side wall roof channel, which is necessary during assembly because of the ductility of the metal roof sheet in order to prevent the roof from tearing during drawing.

However, a problem with the roof structures known from practical application is that with these the freely available length directed from the outside inwards of the flange serving as supporting surface is not adequately dimensioned for a reliable mounting of a panoramic sheet, and moreover the supporting flange does not have the necessary height for the panoramic sheet and the surrounding roof frame to form a substantially plane surface, i.e. to be flush with one another.

Moreover, the known roof structures have the problem that the roof channel present as standard feature cannot be used for adhesion of a sheet, since its structural shape is matched to the roof support and the roof ledge height of conventional roof structures.

Moreover, it is not possible to adhere a sheet in the roof channel of the side wall over the hump.

Therefore, hitherto, where necessary, the supporting surface had to be accordingly adapted subsequently, in which case a surrounding supplementary frame welded into the shell of the vehicle as support and adhesion flange is generally employed. In this case, this supplementary frame extends from the A-column of the vehicle into the lateral roof frame.

However, in this case, the additional welding process that must be subsequently conducted to install the supplementary frame into the roof structure is associated with a high working expenditure, as a result of which the production costs and therefore also the acquisition costs of the vehicle are increased.

Consequently, it is an object of the present invention to improve a conventional roof structure of the aforementioned type such that it is possible to integrate a panoramic sheet into the roof structure in a simple and inexpensive manner without modifications or installations having to be made subsequently for this on the roof frame of the vehicle.

SUMMARY

In this case, a roof structure for a motor vehicle with a roof-supporting roof frame that is suitable to receive different roof modules, such as panoramic roofs etc., is proposed for the first time.

For this, the roof frame of the roof structure has a surrounding flange in each case directed towards the roof centre. In the longitudinal direction of the vehicle the flange has a longitudinal supporting section on each side of the vehicle to support a roof module, which extends over the length of the roof frame and parallel to the roof frame from the free end of the associated flange in the direction of the centre of the vehicle roof.

In this case, this longitudinal supporting section advantageously extends the flange and therefore the supporting surface available for support of the roof modules. Moreover, the flange and the associated longitudinal supporting section are formed in one piece.

This enables the roof structure to advantageously form a constant supporting surface for a panoramic sheet or another roof module as appropriate.

In a particularly advantageous manner here, the longitudinal supporting section extends the flange of the roof frame towards the centre of the vehicle roof, as a result of which the freely available supporting surface for support of a roof module is substantially increased. In this case, it is particularly advantageous that this extension can be easily integrated during production of the vehicle body and renders a subsequent working step to install an additional supporting surface superfluous, since the configuration according to the invention is already provided in the base vehicle.

In this case, this constant supporting surface allows the use of appropriately large-surface glass roofs, so that a large freely transparent surface is provided that noticeably increases the sense of comfort of the driver and possible front passenger as well as providing an improved sense of space.

In addition, in the case of the roof structure formed in one piece according to the invention, no additional welding frame or adapter support is necessary, and this results in a reduction in labor during production and therefore a cost reduction.

At the same time, the absence of the subsequently welded-in adapter support means that the resulting large number of different body shells in previous solutions for the installation of different roof modules can be reduced and thus the production rate can be ultimately increased.

Thus, the supporting section can be of a substantially stepped configuration, as a result of which in addition to the extension to the flange as a result of the supporting section, an increase in height is also created in a direction of vehicle height. Thus, it is advantageously possible to insert different roof modules with different height profiles into the vehicle without welding in any additional adapters or supplementary frames in order to compensate differences in height caused by the geometric characteristics of the roof modules.

Moreover, the predetermined height, to which the flange is raised can correspond to a height, at which the roof module used terminates in alignment with the surrounding roof frame. Thus, it is advantageously possible that both a panoramic sheet and a conventional sheet metal roof module can terminate flush with the surrounding roof surface of the vehicle body, as a result of which air turbulence can be reduced which can lead to an increased air resistance that has negative effects on the economy of the vehicle, and also to noise development.

In addition, a transverse supporting section can be formed in a front roof section by a transversely running connection element of the A-columns of the vehicle, and a further transverse supporting section can be formed in a rear section by a transversely running inner roof frame. In this case, this configuration advantageously supports the constant supporting surface formed by the supporting section for the panoramic sheet or another roof module as appropriate, so that a support of the panoramic roof or other roof modules over the full periphery is achieved. Moreover, a simplification of the production process can be achieved by the use of the transversely running roof elements already provided in the motor vehicle.

BRIEF DESCRIPTION OF THE DRAWINGS

The present invention will hereinafter be described in conjunction with the following drawing figures, wherein like numerals denote like elements.

DETAILED DESCRIPTION

The following detailed description is merely exemplary in nature and is not intended to limit the invention or the application and uses of the invention. Furthermore, there is no intention to be bound by any theory presented in the preceding background of the invention.

Figure 1:
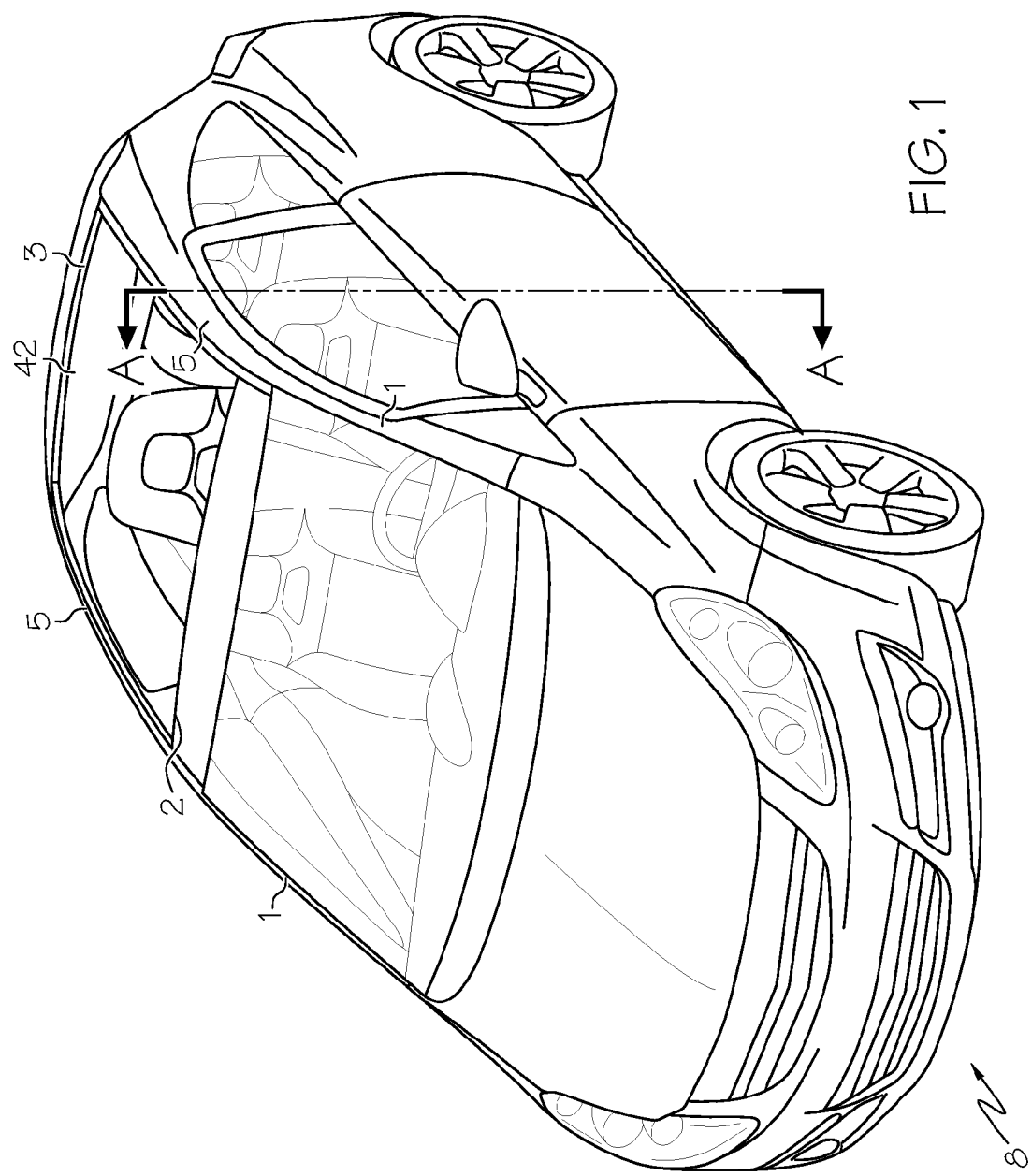
FIG. 1 is a perspective view of a vehicle with a panoramic roof.

FIG. 1 shows a perspective representation of a motor vehicle with a panoramic roof. The vehicle 8 shown in FIG. 1 has a roof structure with a roof frame, wherein the roof frame includes a surrounding support for mounting a roof module. In this case, the support consists of two longitudinal supporting sections 5 as well as two transverse supporting sections 2 or 3.

In this case, the transverse supporting sections 2 or 3 are formed in a front region of the vehicle roof by a connecting element 2 running transversely over the A-columns 1, and in a rear region of the vehicle roof by a transverse-running inner roof frame 3.

In addition, the longitudinal supporting sections 5 running laterally in the longitudinal direction of the vehicle extend from the rear of the vehicle as far as the A-columns 1.

Figure 2:
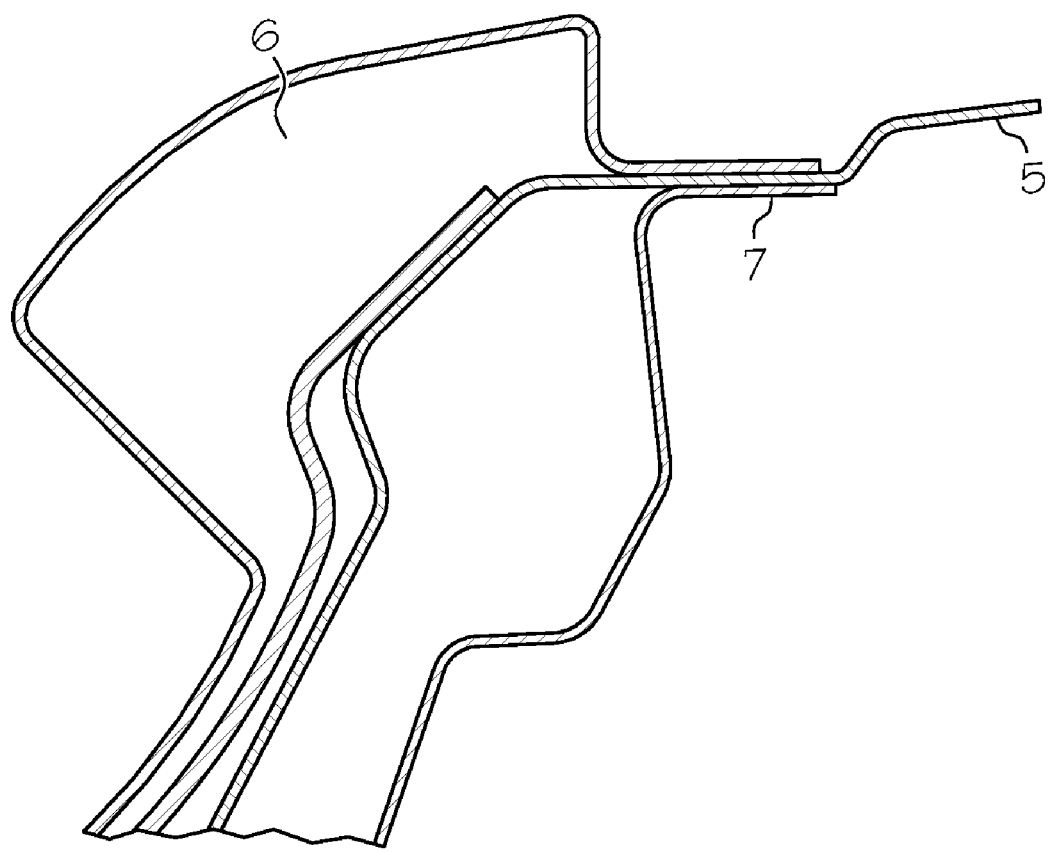
FIG. 2 is a detail view of a section of the roof structure according to the invention.

FIG. 2 shows an enlarged detail view of the roof structure in a section taken along line A-A indicated in FIG. 1. In this case, it can be seen from FIG. 2 that the roof frame 6 has a flange 7 directed towards the vehicle centre, on which the stepped supporting section 5 is formed. The stepped configuration of the supporting section 5 in this case increases the height of the flange in the direction of the vehicle height to a predetermined height, wherein this increase in height can lie in a range of between 10 and 50 mm. At this predetermined height, the supporting section 5 runs on the inside past the hump of the roof channel and parallel to the roof channel.

As may be seen from FIG. 2, the flange 7 is extended by the supporting section by about one flange length to 1.5- to 2.5- times its length. On average, the increase in length in most cases corresponds to an increase in length of the flange to double its original dimensions.

In the embodiment shown in FIG. 2, the increase in size of the flange 7 through the supporting section 5 corresponds to an increase in length in a range of between 15 mm and 30 mm. Alternatively, the increase in size can also lie in a range from 10 to 60 mm, depending on the respective vehicle.

Figure 3:
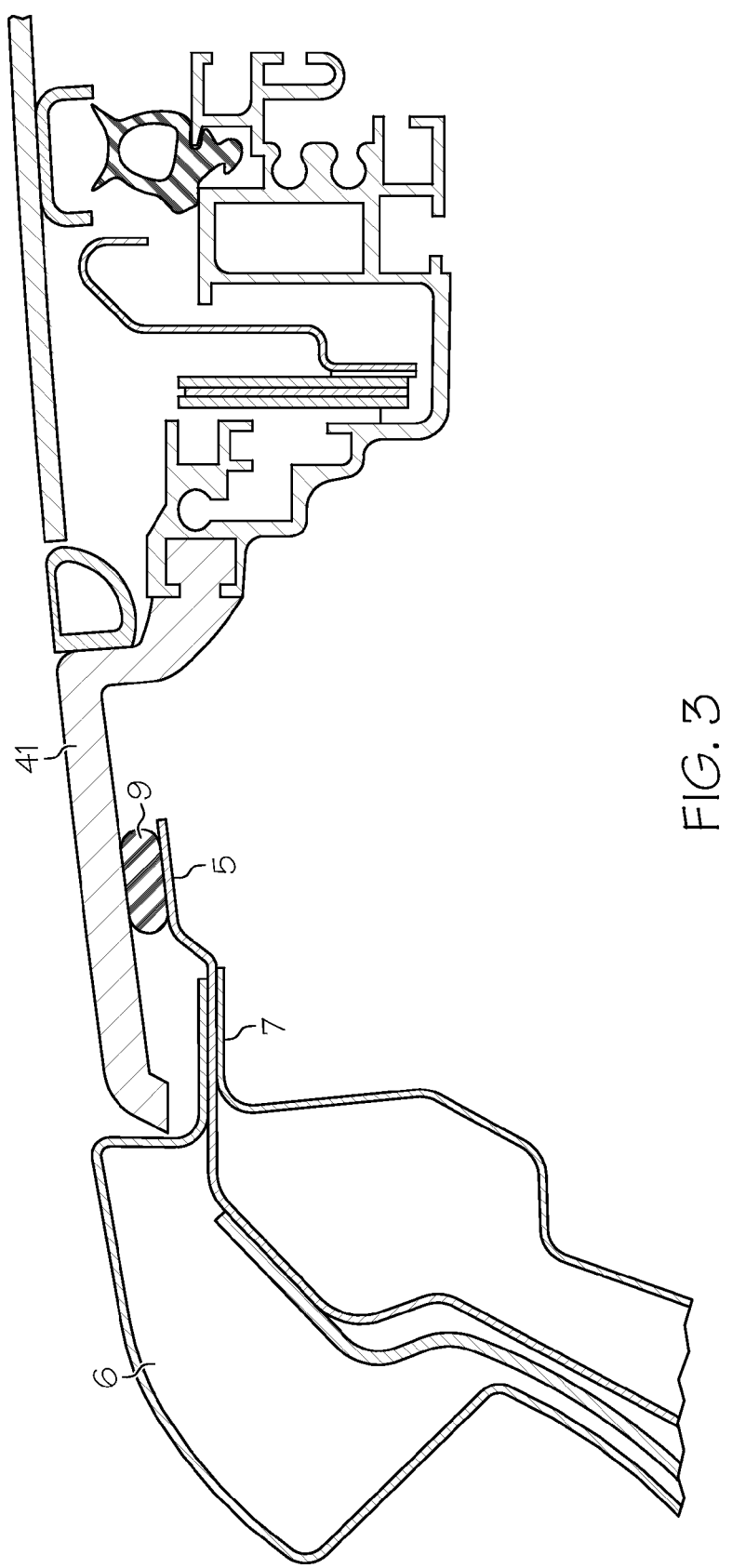
FIG. 3 is a detail view of the roof structure from FIG. 2 with a conventional sheet metal roof.

FIG. 3 shows the detail view of the roof structure from FIG. 2 with a conventional sheet metal roof module 41 that lies on the supporting section 5 of stepped configuration and extends over the flange 7 as far as the edge of the roof frame 6.

The sheet metal roof module 41 in this embodiment is adhered to the supporting surface 5 on the roof frame 6 by means of adhesive compound 9. Alternatively, it is also possible when using a sheet metal roof module 41 to adhere the module 41 not only to the supporting section 5 formed on the flange 7 but directly to the flange 7 because of its expansion in the direction of the vehicle width.

Figure 4:
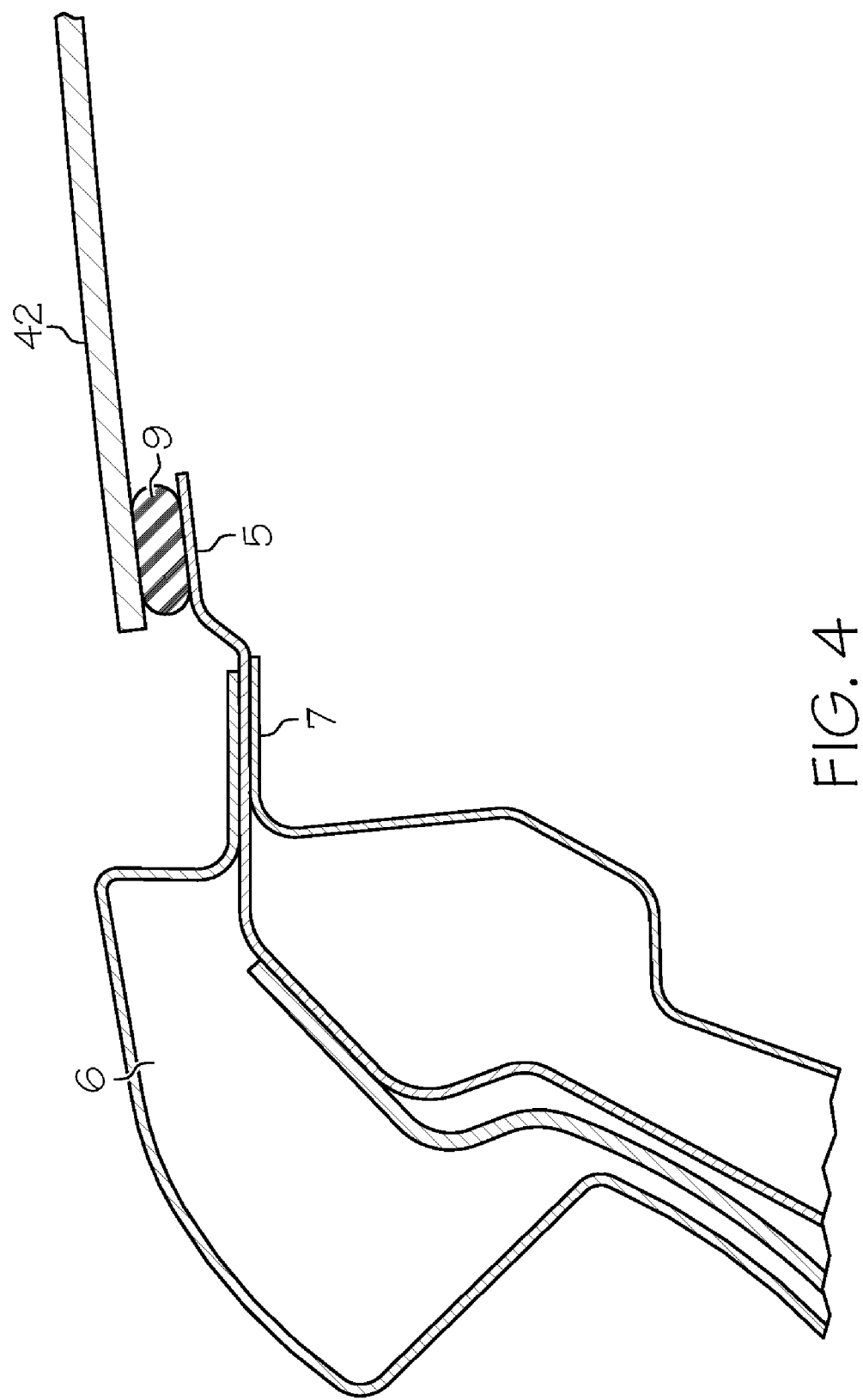
FIG. 4 is a detail view of the roof structure from FIG. 2 with a panoramic roof.

FIG. 4 shows an alternative embodiment of the detail view from FIG. 2, in which a panoramic roof module 42 is used as vehicle roof.

The glass sheet of the panoramic roof module 42 in this case lies solely on the supporting section 5 formed on the flange 7. Like the sheet metal roof module from FIG. 3, the panoramic roof module 42 is also adhered to the roof frame 6. The adhesion of the panoramic roof module 42 to the roof frame 6 is achieved in such a manner that the panoramic roof module 42 is adhered by means of adhesive compound 9 to the supporting section 5.

Besides the above-described preferred embodiment of the roof structure for a motor vehicle, further possibilities for solving the previously presented objects and other objects not presented, forming the basis of the invention will be evident to the skilled person on the basis of the proposed alternative embodiments.

While at least one exemplary embodiment has been presented in the foregoing description, it should be appreciated that a vast number of variations exist. It should also be appreciated that the exemplary embodiment or exemplary embodiments are only examples, and are not intended to limit the scope, applicability, or configuration in any way. Rather, the foregoing detailed description will provide those skilled in the art with a convenient road map for implementing an exemplary embodiment, it being understood that various changes may be made in the function and arrangement of elements described in an exemplary embodiment without departing from the scope as set forth in the appended claims and their legal equivalents.

The invention claimed is:

1. A roof supporting structure for a motor vehicle, comprising:
   a roof frame vertically supported by at least a pair of A-columns of the motor vehicle;
   a roof module which extends over the length and width of the roof frame and substantially parallel to the roof frame;
   a flange directed inward toward a longitudinal centerline of the roof frame and formed along the longitudinal direction of the roof frame; and
   a longitudinal supporting section sandwiched between an upper surface of the flange and a lower surface of the frame, the longitudinal supporting section supporting the roof module which is adhered to a free edge of the longitudinal supporting section that steps upward to a predetermined height and extends in the direction of the longitudinal centerline of the roof frame.

2. The roof supporting structure according to claim 1, wherein the predetermined height corresponds to a height at which the roof module terminates flush with the surrounding roof frame.

3. The roof supporting structure according to claim 1, further comprising a front transverse supporting section formed in a front region of the vehicle by a transversely running connection element between the A-columns, and a rear transverse supporting section formed in a rear region of the vehicle by a rear transversely running inner roof frame.

* * * * *